(12) United States Patent
Mitsuda et al.

(10) Patent No.: US 8,997,734 B2
(45) Date of Patent: Apr. 7, 2015

(54) SOLAR CONCENTRATING HEAT RECEIVER AND SYSTEM THEREOF

(75) Inventors: Kimihiko Mitsuda, Tokyo (JP); Yasuharu Yamamoto, Tokyo (JP); Toshiyuki Osada, Tokyo (JP); Masashi Tagawa, Tokyo (JP); Kazuta Kobayashi, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 778 days.

(21) Appl. No.: 13/324,875

(22) Filed: Dec. 13, 2011

(65) Prior Publication Data
US 2012/0160232 A1 Jun. 28, 2012

(30) Foreign Application Priority Data
Dec. 28, 2010 (JP) ................... P2010-293687

(51) Int. Cl.
| | | |
|---|---|---|
| F24J 2/06 | (2006.01) | |
| F24J 2/07 | (2006.01) | |
| F24J 2/46 | (2006.01) | |
| F24J 2/24 | (2006.01) | |
| F24J 2/52 | (2006.01) | |

(52) U.S. Cl.
CPC *F24J 2/07* (2013.01); *F24J 2/4636* (2013.01); *F24J 2/245* (2013.01); *F24J 2/4647* (2013.01); *F24J 2002/529* (2013.01); *Y02E 10/41* (2013.01)

(58) Field of Classification Search
USPC .................. 126/663, 704, 680, 710, 271, 606
See application file for complete search history.

(56) References Cited

U.S. PATENT DOCUMENTS

| 4,126,270 A | * | 11/1978 | Hummel | 126/631 |
|---|---|---|---|---|
| 4,233,961 A | * | 11/1980 | Kelly | 126/619 |
| 2009/0184223 A1 | * | 7/2009 | Schwarze et al. | 248/237 |
| 2009/0241939 A1 | * | 10/2009 | Heap et al. | 126/645 |
| 2010/0077592 A1 | * | 4/2010 | Casano | 29/434 |
| 2010/0101564 A1 | * | 4/2010 | Iannacchione et al. | 126/680 |
| 2011/0180058 A1 | * | 7/2011 | MacKay et al. | 126/605 |

(Continued)

FOREIGN PATENT DOCUMENTS

| CN | 201787746 U | * | 4/2011 | | F24J 2/24 |
|---|---|---|---|---|---|
| JP | 5766465 | | 4/1982 | | |
| JP | 57098751 A | * | 6/1982 | | F24J 3/02 |

(Continued)

OTHER PUBLICATIONS

International Search Report with English Translation, mailing date Mar. 19, 2012.

(Continued)

*Primary Examiner* — Gregory Huson
*Assistant Examiner* — Nikhil Mashruwala
(74) *Attorney, Agent, or Firm* — Kanesaka, Berner & Partners (57) ABSTRACT

The concentrating heat receiver (10) is provided with a casing (41) which has an opening portion (15) into which sunrays are made incident, a heat receiving portion (42) which is accommodated inside the casing (41) so that a working fluid flows therethrough and receive heat from sunrays made incident from the opening portion, thereby raising the temperature of the working fluid, and hanging members (61, 62) in which the upper end sides thereof are coupled to an upper angle (14) and the other end sides thereof are loosely inserted into through holes (44a, 44b) of the casing (41), thereby supporting in a hanging manner the heat receiving portion (42) inside the casing (41).

10 Claims, 9 Drawing Sheets

(56) References Cited

U.S. PATENT DOCUMENTS

| | | | |
|---|---|---|---|
| 2012/0012102 A1* | 1/2012 | Nakamura | 126/674 |
| 2012/0312296 A1* | 12/2012 | Morse et al. | 126/680 |

FOREIGN PATENT DOCUMENTS

| | | |
|---|---|---|
| JP | 11-280638 A | 10/1999 |
| JP | 2000-507336 A | 6/2000 |
| JP | 2002-364934 A | 12/2002 |
| JP | 2002364934 A | 12/2002 |
| JP | 2003-056341 A | 2/2003 |
| JP | 2005214604 A | 8/2005 |
| JP | 200924498 A | 2/2009 |
| JP | 2009-024498 A | 5/2009 |
| JP | 2010236699 A | 10/2010 |
| JP | 2011-007150 A | 1/2011 |
| WO | 2009057553 A1 | 5/2009 |
| WO | 20100119945 A1 | 10/2010 |

OTHER PUBLICATIONS

Written Opinion with English Translation.

\* cited by examiner

SOLAR CONCENTRATING HEAT RECEIVER AND SYSTEM THEREOF

TECHNICAL FIELD

The present invention relates to a solar concentrating heat receiver and a solar concentrating heat receiving system.

The present application claims the right of priority to Japanese Patent Application No. 2010-293687 filed on Dec. 28, 2010, in Japan, with the content cited herewith.

BACKGROUND ART

In recent years, an apparatus is known which utilizes thermal energy obtained by collecting sunrays as clean energy which will not affect the environment. As the above-described apparatus, there has been developed a solar concentrating heat receiving system (hereinafter, referred to as a concentrating heat receiving system which converts thermal energy obtained by collecting sunrays to electrical energy to generate power (refer to Patent Document 1, for example).

In the above-described concentrating heat receiving system, sunlight and heat are normally collected by a combination of a heat receiver and a sunlight collecting apparatus in which mirrors are used. As the above-described combination types of the sunlight collecting apparatus with the heat receiver, there are in general two types available, that is, a trough-type light collecting system and a tower-type light collecting system.

In the trough-type light collecting system, a half-cylindrical mirror (a trough) is used to reflect sunrays to collect sunlight and heat in a pipe passing through the center of a cylinder, thereby raising the temperature of a working fluid which passes through the pipe. However, the trough-type light collecting system is subjected to uniaxial control in which the mirror turns so as to follow sunrays and, therefore, cannot be expected to significantly raise the temperature of the working fluid.

On the other hand, the tower-type light collecting system is provided with a concentrating heat receiver placed above a tower unit which is erected from the ground and a plurality of reflection light control mirrors for collecting sunlight which is referred to as heliostats are placed so as to surround the tower unit, thereby guiding sunrays reflected by the heliostats into the concentrating heat receiver to collect sunlight and heat. In recent years, in view of further enhancing a power generation cycle, there has been actively developed a concentrating heat receiving system which is a tower-type light collecting system where the concentrating heat receiver can be used to conduct heat exchange, thereby increasing the temperature of a working fluid to a greater extent.

For example, as shown in Patent Document 2, a concentrating heat receiver used in a tower-type light collecting system is provided with a casing having an opening portion into which sunrays are made incident, and a heat receiving portion which receives sunrays made incident into the casing. Further, the heat receiving portion is provided with a plurality of heat receiving pipes which extend along an inner circumferential face of the casing, a low-temperature side header are collectively connected to one ends of the plurality of heat receiving pipes, where one ends are the upstream side of the heat receiving pipes in relation to a flowing direction of a working fluid, and a high-temperature side header are collectively connected to the other ends of the plurality of heat receiving pipes, where the other ends are the downstream side of the heat receiving pipes in relation to the flowing direction of the working fluid.

PRIOR ART DOCUMENTS

Patent Document

[Patent Document 1] Japanese Published Unexamined Patent Application No. Hei-11-280638
[Patent Document 2] U.S. Patent Application Publication No. 2009/0241939

SUMMARY OF THE INVENTION

Problem to be Solved by the Invention

In the above-described concentrating heat receiver, when the heat receiving portion (the heat receiving pipes) is heated by sunrays and increased in temperature, the portion is subjected to thermal expansion (thermal elongation) and deformed.

In this instance, according to the constitution of the above-described Patent Document 2, the heat receiving portion (each of the headers) is fixed to the casing. Therefore, the heat receiving portion fails in allowing the thermal elongation to cause thermal stress, which poses a problem.

The present invention has been made in view of the above situation, an object of which is to provide a solar concentrating heat receiver and a solar concentrating heat receiving system capable of suppressing thermal stress which acts on a heat receiving portion.

Means for Solving the Problem

The solar concentrating heat receiver of the present invention is provided with a casing which is installed at a base portion to have an opening portion into which sunlight is made incident, a heat receiving portion which is accommodated inside the casing so that a working fluid flows therethrough and receive heat from sunlight made incident from the opening portion, thereby raising a temperature of the working fluid, and a hanging member in which one end of the heat receiving portion is coupled to the base portion and the other end thereof is loosely inserted into the casing, thereby supporting in a hanging manner the heat receiving portion inside the casing.

Then, according to the above-constituted solar concentrating heat receiver, the heat receiving portion is not restricted by the casing but supported only by the hanging member from outside of the casing (a base portion). Thus, when the heat receiving portion is thermally elongated, the heat receiving portion undergoes a relative deformation with respect to the casing. Thereby, it is possible to allow deformation of the heat receiving portion by thermal elongation and also to suppress the occurrence of thermal stress.

Further, in the solar concentrating heat receiver of the present invention, the heat receiving portion is provided with a plurality of heat receiving pipes extending along an inner circumferential face of the casing, a working fluid introduction header which is coupled with one ends of the plurality of heat receiving pipes, where one ends are upstream side of the heat receiving pipes in relation to a flowing direction of a working fluid to introduce the working fluid into the plurality of heat receiving pipes, and a working fluid discharge header which is coupled with the other ends of the plurality of heat receiving pipes, where the other ends are downstream side of the heat receiving pipes in relation to the flowing direction of the working fluid to discharge the working fluid which flows through the plurality of heat receiving pipes. The working fluid discharge header is placed upward on the plurality of heat receiving pipes in a vertical direction, and the hanging member is coupled at the other end thereof to the working fluid discharge header.

According to the above-described constitution, the heat receiving portion is supported in a hanging manner by the hanging member coupled to the working fluid discharge header which is placed upward on the heat receiving pipes in the vertical direction. Thereby, it is possible to allow deformation of the heat receiving portion by thermal elongation in a vertical direction, in particular.

Further, in the solar concentrating heat receiver of the present invention, the hanging member is provided with a first hanging member which is fixed to the working fluid discharge header at a center part of the working fluid discharge header in an extending direction, and a pair of second hanging members which are coupled to the working fluid discharge header on both sides of the first hanging member in the extending direction and allowed to sway so as to follow displacement of the heat receiving portion.

According to the above constitution, since the first hanging member is fixed at the center part of the working fluid discharge header in the extending direction, it is possible to disperse thermal elongation of the heat receiving portion to both sides of the working fluid discharge header from a point at which the first hanging member is coupled to the working fluid discharge header. Thereby, as compared with a case where the heat receiving portion is entirely supported so as to sway, it is possible to suppress an entire inclination and subsequent deformation of the heat receiving portion and also suppress the deformation amount of the heat receiving portion.

In this instance, the second hanging member is coupled to the working fluid discharge header so as to sway freely. Thereby, each of the second hanging members sways so as to follow thermal elongation of the heat receiving portion which occurs from the first hanging member. Thus, it is possible to allow more smoothly deformation of the heat receiving portion by thermal elongation in a horizontal direction, in particular.

Further, in the solar concentrating heat receiver of the present invention, the working fluid introduction header is provided with a guide member which allows the heat receiving portion to slide along the vertical direction with respect to the casing.

According to the above-described constitution, it is possible to allow thermal elongation of the heat receiving portion in the vertical direction, with the thermal elongation thereof being regulated in the horizontal direction. It is, thereby, possible to suppress inclination of the heat receiving portion due to thermal elongation.

Still further, a solar concentrating heat receiving system of the present invention is provided with a plurality of reflecting mirrors which are placed on a ground to reflect sunrays, a tower unit which is erected from the ground, and the solar concentrating heat receiver of the present invention which is supported by the tower unit.

Then, the above-constituted solar concentrating heat receiving system is provided with the solar concentrating heat receiver of the present invention. Thereby, thermal stress acting on a heat receiving portion can be suppressed to improve durability.

Effect of the Invention

The solar concentrating heat receiver of the present invention allows the heat receiving portion to undergo thermal elongation, thus making it possible to suppress thermal stress which acts on the heat receiving pipes.

Further, since the solar concentrating heat receiving system of the present invention is provided with the solar concentrating heat receiver (also referred to as a concentrating heat receiver of the present invention, it is possible to suppress the thermal stress which acts on the heat receiving portion and improves durability.

MODE FOR CARRYING OUT THE INVENTION

Next, a description will be given of the embodiment of the present invention based on the drawings. In the following description, a description is given by exemplifying a solar thermal power generation system (hereinafter, referred to as a power generation system) in which the solar concentrating heat receiver of the present invention is integrally constituted with a gas turbine unit which generates power by using a working fluid heated by the solar concentrating heat receiver. (Power Generation System)

Figure 1:
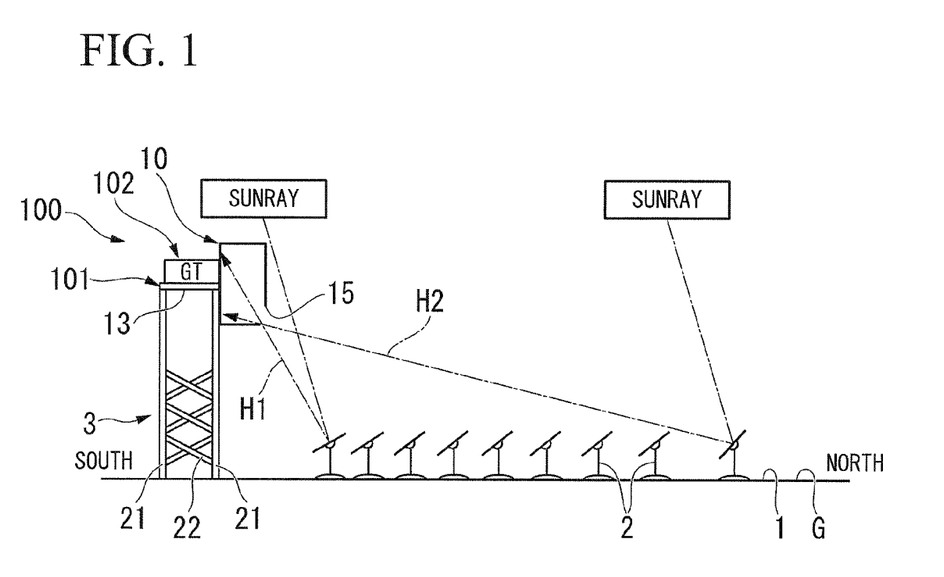
FIG. 1 is a side view which shows a power generation system of an embodiment.

FIG. 1 is a view which describes a positional relationship between a heliostat and the concentrating heat receiver above a tower, and FIG. 1 is a side view of the power generation system. Places on earth appropriate for erecting the power generation system are dry areas in a subtropical high-pressure belt which is closer to a tropic and where direct radiation from the sun is strong and favorable. Therefore, in the power generation system of the present embodiment, a description is given, in particular for a type of power generation system (one-side placement system) which is placed at a high latitude area in the subtropical high-pressure belt.

In FIG. 1, a heliostat field placed on a ground G is indicated by a reference numeral 1. A power generation system 100 is provided with a concentrating heat receiving system 101 which collects sunrays (for example, H1, H2 in FIG. 1) irradiated at the heliostat field 1 to receive heat, and a gas turbine unit 102 which generates power by using a working fluid (for example, air) heated by the heat received from the concentrating heat receiving system 101. In this instance, although a detailed description will be omitted here, the gas turbine unit 102 is substantially provided with a compressor for compressing a working fluid heated by the concentrating heat receiving system 101, a turbine to which the working fluid compressed by the compressor is supplied, a rotor which couples coaxially the compressor to the turbine, and a generator which is connected to the rotor. Then, the rotor is turned by the working fluid supplied to the turbine, by which the compressor compresses the working fluid, and power can be generated by the generator.

(Concentrating Heat Receiving System)

The concentrating heat receiving system 101 is provided with a plurality of heliostats 2 which are placed on the heliostat field 1 to reflect sunrays H1, H2, a tower unit 3 which is erected on the ground G, and a concentrating heat receiver 10 which is placed above the tower unit 3 to receive sunray H. Here, in the present embodiment, the tower unit 3 is placed on one end side of the heliostat field 1 (a south end part in a north-south direction). Further, the heliostats 2 are arrayed on the other end side of the heliostat field 1 (north side) and in a region within a predetermined angle range at the center of the tower unit 3. That is, the heliostat field 1 is set in a fan-like shape at the center of the tower unit 3.

The tower unit 3 is provided with a plurality of column supports 21 (for example, four column supports) which are erected from the ground G upward and beam portions 22 coupled so as to bridge between the individual column supports 21. Further, there is provided above the tower unit 3 a frame (a base portion) 13 for supporting the above-described concentrating heat receiver 10, the gas turbine unit 102, and so on.

(Concentrating Heat Receiver)

Figure 2:
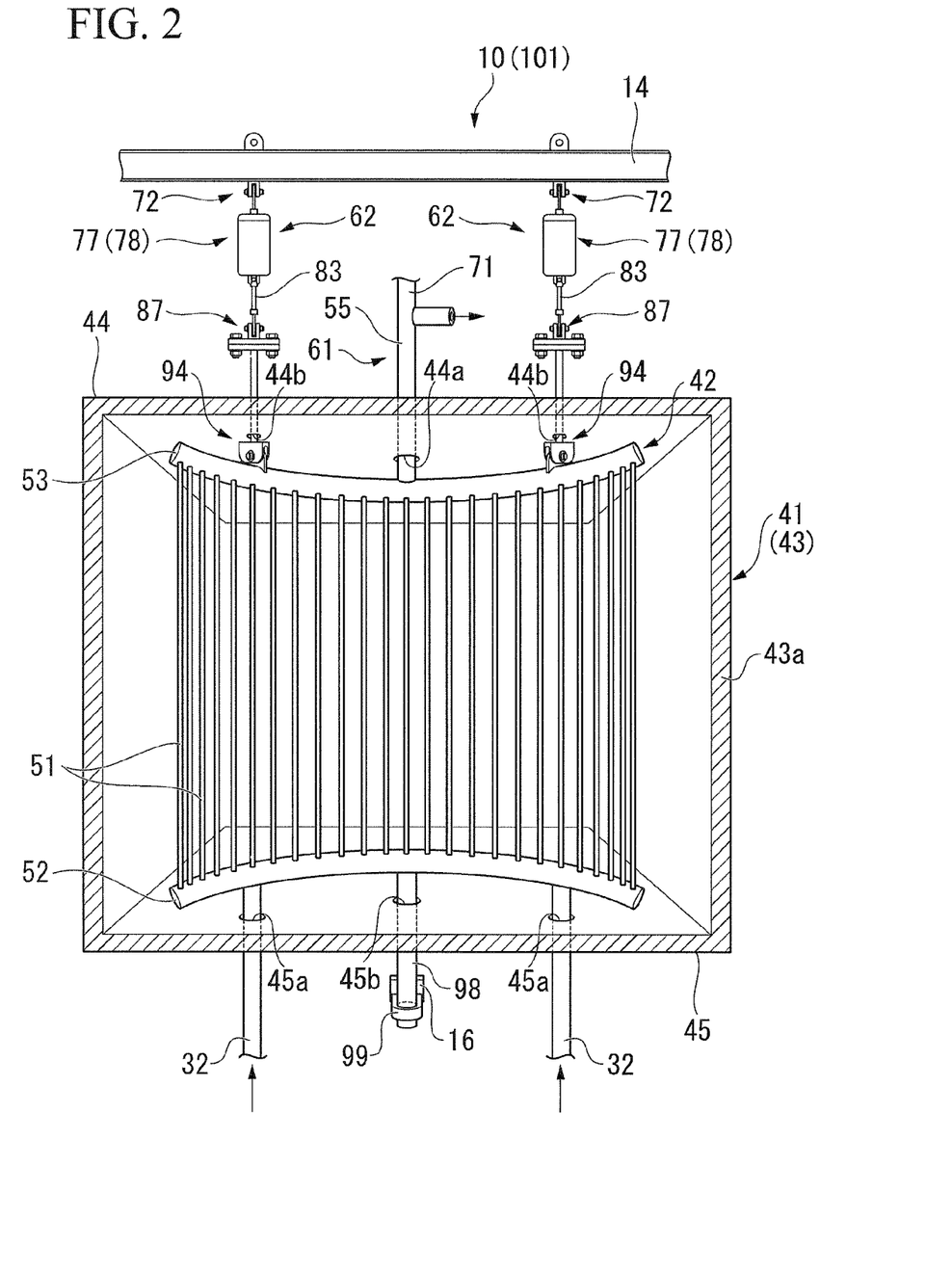
FIG. 2 is a front view which shows a concentrating heat receiver of the embodiment.
Figure 3:
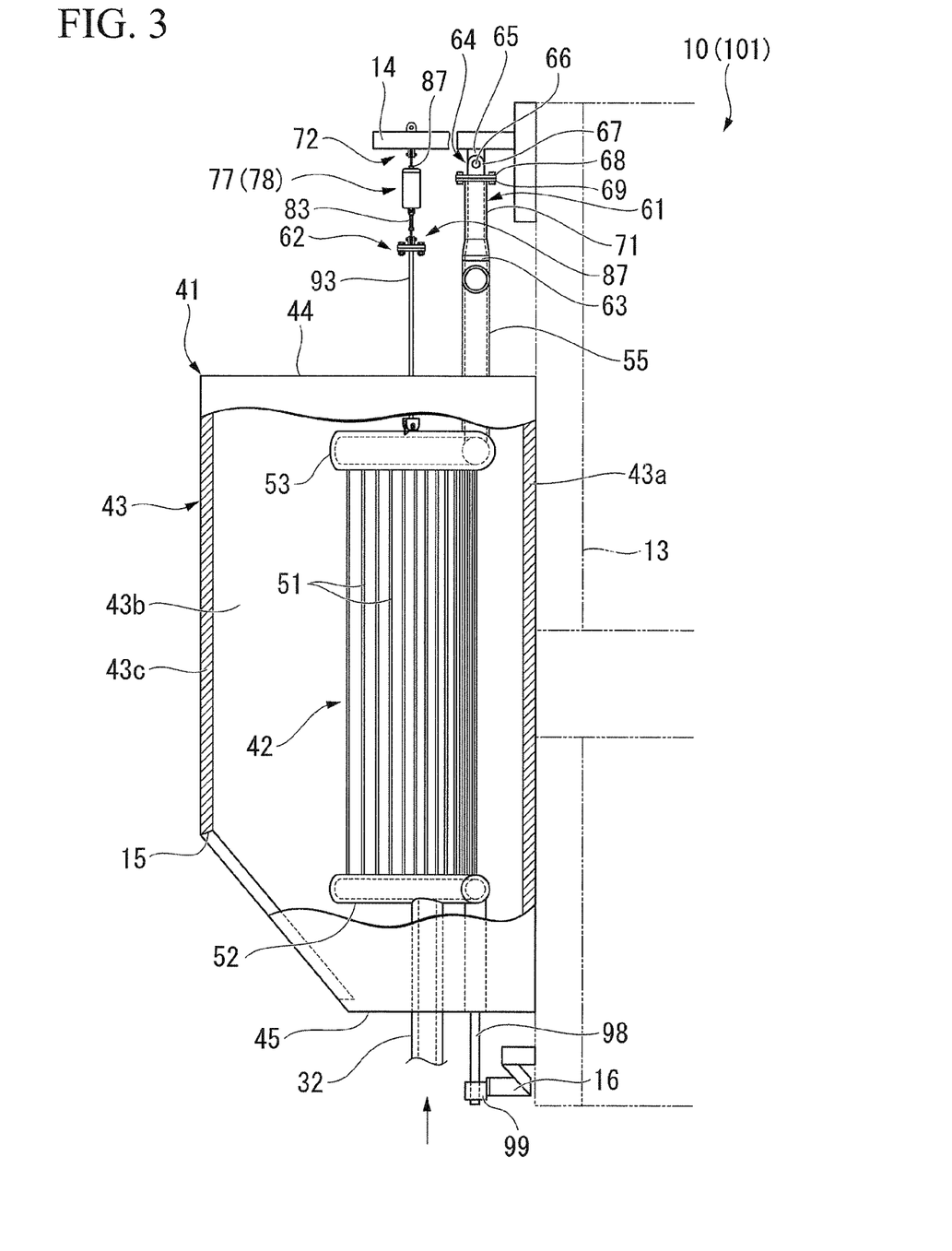
FIG. 3 is a side view which shows the concentrating heat receiver of the embodiment.
Figure 4:
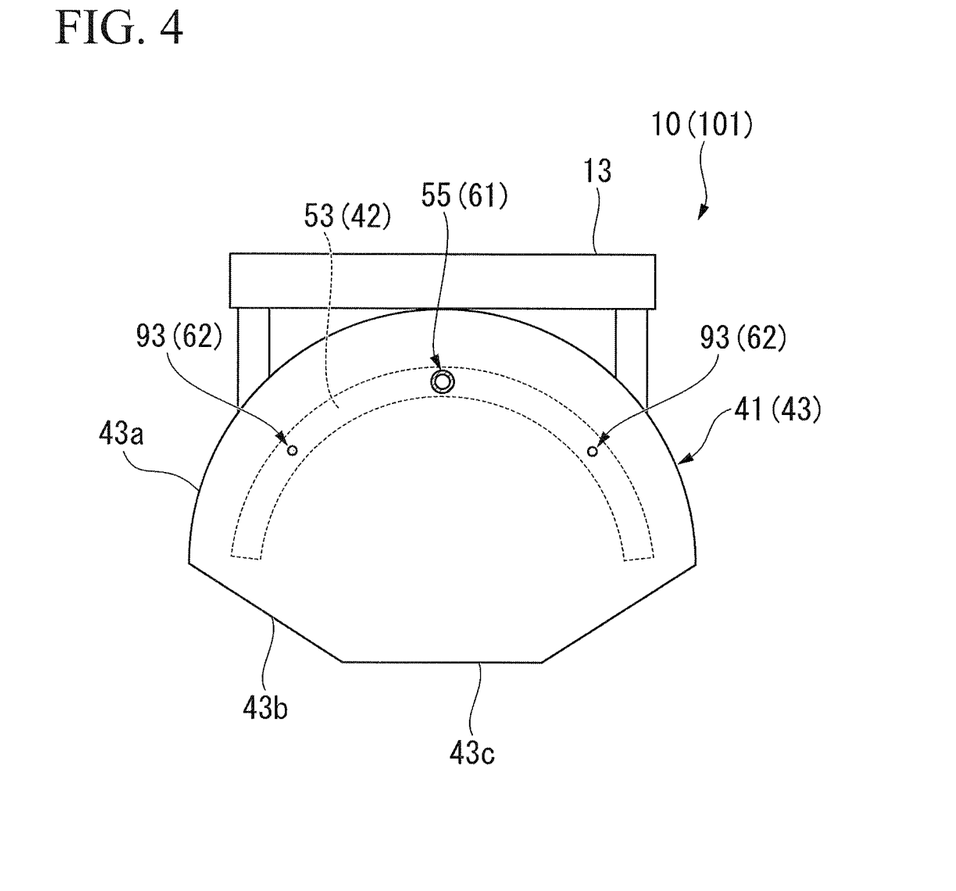
FIG. 4 is a plan view which shows the concentrating heat receiver of the embodiment.

FIG. 2 is a front view of the concentrating heat receiver, FIG. 3 is a side view thereof and FIG. 4 is a plan view thereof. In addition, in FIG. 2, in order to give a better understanding of an inner structure of the concentrating heat receiver, a front wall portion 43c and a side wall portion 43b of a casing 41 to be described later are omitted. Further, in the following description, a description will be given so that an upstream side (north side in the present embodiment) in irradiation directions of sunrays H1, H2 is given as a front side, while a downstream side (south side in the present embodiment) is given as a rear side.

As shown in FIG. 2 to FIG. 4, the concentrating heat receiver 10 is provided with the casing 41 having an opening portion 15 (refer to FIG. 3) into which sunlight is made incident, and a heat receiving portion 42 which is accommodated inside the casing 41 so that a working fluid flows therethrough and receive heat through irradiation of the sunrays H1, H2 reflected by the heliostats 2.

The casing 41 is a closed-end tubular member, the cross section of which is formed in a fan-like shape, when viewed from above, and provided with a tubular portion 43 which extends along the vertical direction, a top panel portion 44 which closes an upper part of the tubular portion 43, and a bottom wall portion 45 which closes a lower part of the tubular portion 43.

The tubular portion 43 is provided with a circular-arc shaped rear wall portion 43a (refer to FIG. 4) which swells out backward, with the vertical direction being in alignment with the axial direction, a pair of side wall portions 43b (refer to FIG. 3) which extend so as to come closer to each other as moving from the both end portions of the rear wall portion 43a in the circumferential direction to the front, and a front wall portion 43c (refer to FIG. 3) which bridges between the front end portions of the side wall portions 43b.

A circumferential center part of the rear wall portion 43a is coupled to the frame 13 of the above-described tower unit 3, by which the casing 41 is supported by the tower unit 3.

Further, the opening portion 15 which is opened toward the ground G is formed on the front sides (the front wall portion 43c and the bottom wall portion 45) at a lower part of the casing 41. More specifically, the opening portion 15 is opened downward in a diagonally forward direction, and the sunrays H1, H2 reflected by the heliostats 2 are taken into the casing 41 through the opening portion 15. An insulation material (not shown) is installed over the entire inside of the casing 41. Thereby, it is possible to suppress emission of thermal energy inside the casing 41 from wall faces of the casing 41 toward the outside.

The heat receiving portion 42 is provided with a plurality of heat receiving pipes 51, a low-temperature side header (a working fluid introduction header) 52 are collectively connected to one ends of the plurality of heat receiving pipes 51, where one ends are upstream side of the heat receiving pipes in relation to a flowing direction of a working fluid, and a high-temperature side header (a working fluid discharge header) 53 are collectively connected to the other ends of the plurality of heat receiving pipes 51, where the other ends are downstream side of the heat receiving pipes in relation to the flowing direction of the working fluid.

The low-temperature side header 52 is a circular-arc shaped pipe which extends along an inner face of the rear wall portion 43a at a lower part inside the casing 41. A plurality of heat receiver supplying channels 32 for supplying the working fluid to the heat receiving portion 42 (the low-temperature side header 52) are installed at the both end portions of the low-temperature side header 52 in the circumferential direction. Each of the heat receiver supplying channels 32 extends downward from the low-temperature side header 52. In addition, each of them is loosely inserted inside a through hole 45a formed at the bottom wall portion 45 of the casing 41 and drawn out of the casing 41. That is, the heat receiver supplying channel 32 is movable through the through hole 45a.

The upstream end of the heat receiver supplying channel 32 is connected to the compressor of the above-described gas turbine unit 102, thereby supplying a working fluid from the compressor. There is installed a seal member (not shown) between the heat receiver supplying channel 32 and the through hole 45a. The seal member seals the through hole 45a of the casing 41, insulating heat between the interior and exterior of the casing 41, thereby sealing the heat receiver supplying channel 32 so as to be movable inside the through hole 45a.

The high-temperature side header 53 is a circular-arc shaped pipe which extends along an inner face of the rear wall portion 43a at an upper part inside the casing 41. A heat receiver discharging channel (a first hanging member) 55 for discharging the working fluid from the heat receiving portion 42 (the high-temperature side header 53) is connected to a circumferential center part of the high-temperature side header 53.

The heat receiver discharging channel 55 which extends from the high-temperature side header 53 upward is loosely inserted into a through hole 44a (refer to FIG. 2) formed at the top panel portion 44 of the casing 41 and drawn out of the casing 41. That is, the heat receiver discharging channel 55 is movable through the through hole 44a.

The downstream side (the upper end portion) of the heat receiver discharging channel 55 is bent in the horizontal direction and, thereafter, connected to the above-described turbine via a turbine supplying channel (not shown). Thereby, a working fluid heated at the heat receiving portion 42 is supplied to the turbine through the heat receiver discharging channel 55 and the turbine supply channel. The turbine supply channel is preferably constituted of a flexible material.

Further, there is installed a seal member (not shown) between the heat receiver discharging channel 55 and the through hole 44a. The seal member seals the through hole 44a of the casing 41, insulating heat between the interior and the exterior of the casing 41, thereby sealing the heat receiver discharging channel 55 so as to be movable inside the through hole 44a.

The heat receiving pipe 51 is a member placed so that the axial direction thereof is in alignment with the vertical direction and arrayed on an inner face of the rear wall portion 43a of the casing 41, with a space kept circumferentially. The lower end portion (the upstream end) of each of the heat receiving pipes 51 is connected to the low-temperature side header 52, while the upper end portion (the downstream end) of each of the heat receiving pipes 51 is connected to the high-temperature side header 53 inside the casing 41. That is, a working fluid which flows through the low-temperature side header 52 is dispersed into each of the heat receiving pipes 51. After being heated inside each of the heat receiving pipes 51, the working fluid collects again at the high-temperature side header 53.

Each of the heat receiving pipes 51 is arrayed with each other in parallel at every predetermined pitch in a state that a space is kept with a heat receiving pipe 51 adjacent in a circumferential direction of the rear wall portion 43a.

(Hanging Member)

Here, the heat receiving portion 42 of the present embodiment is not fixed to the casing 41 but supported in a hanging manner by a plurality of hanging members (a first hanging member 61 and a second hanging member 62) from outside of the casing 41. Each of the hanging members 61, 62 is coupled at the upper end thereof to an upper angle (a base portion) 14 extending from an upper part of the frame 13 to the front, while loosely inserted at the lower end thereof into the casing 41 and coupled to the above-described high-temperature side header 53. The upper angle 14 extends in parallel with the top panel portion 44 above the casing 41.

As shown in FIG. 3, among the hanging members 61, 62, the first hanging member 61 is provided with a first pin connecting portion 64 which is allowed to sway with respect to the upper angle 14. The first pin connecting portion 64 is provided with a plate-like male clevis 65 protruding from the upper angle 14 downward, and a female clevis 67 supported via a coupling pin 66 so as to sway with respect to the male clevis 65.

In the female clevis 67, two plates are placed so as to oppose each other in the thickness direction, and the male clevis 65 is inserted into the female clevis 67 (between the plates). A pin hole (not shown) is formed on each of the male clevis 65 and the female clevis 67 at a position where they are overlapped in the thickness direction. The coupling pin 66 is inserted through these pin holes (not shown), by which the female clevis 67 is allowed to sway in a back and forth direction around the coupling pin 66 with respect to the male clevis 65.

A tubular vessel 71 is coupled to the lower end of the female clevis 67 via flange portions 68, 69. The tubular vessel 71 is a cylindrical member, the axial direction of which extends along the vertical direction, and the lower end side thereof is coupled via a flange portion 63 to a bent portion (an upper end portion) of the above-described heat receiver discharging channel 55.

Then, the lower end of the heat receiver discharging channel 55 is, as described above, connected to the circumferential center part of the high-temperature side header 53.

That is, the above-described first pin connecting portion 64, the tubular vessel 71 and the heat receiver discharging channel 55 constitute the first hanging member 61 which supports in a hanging manner the circumferential center part of the high-temperature side header 53 from outside of the casing 41.

Figure 5:
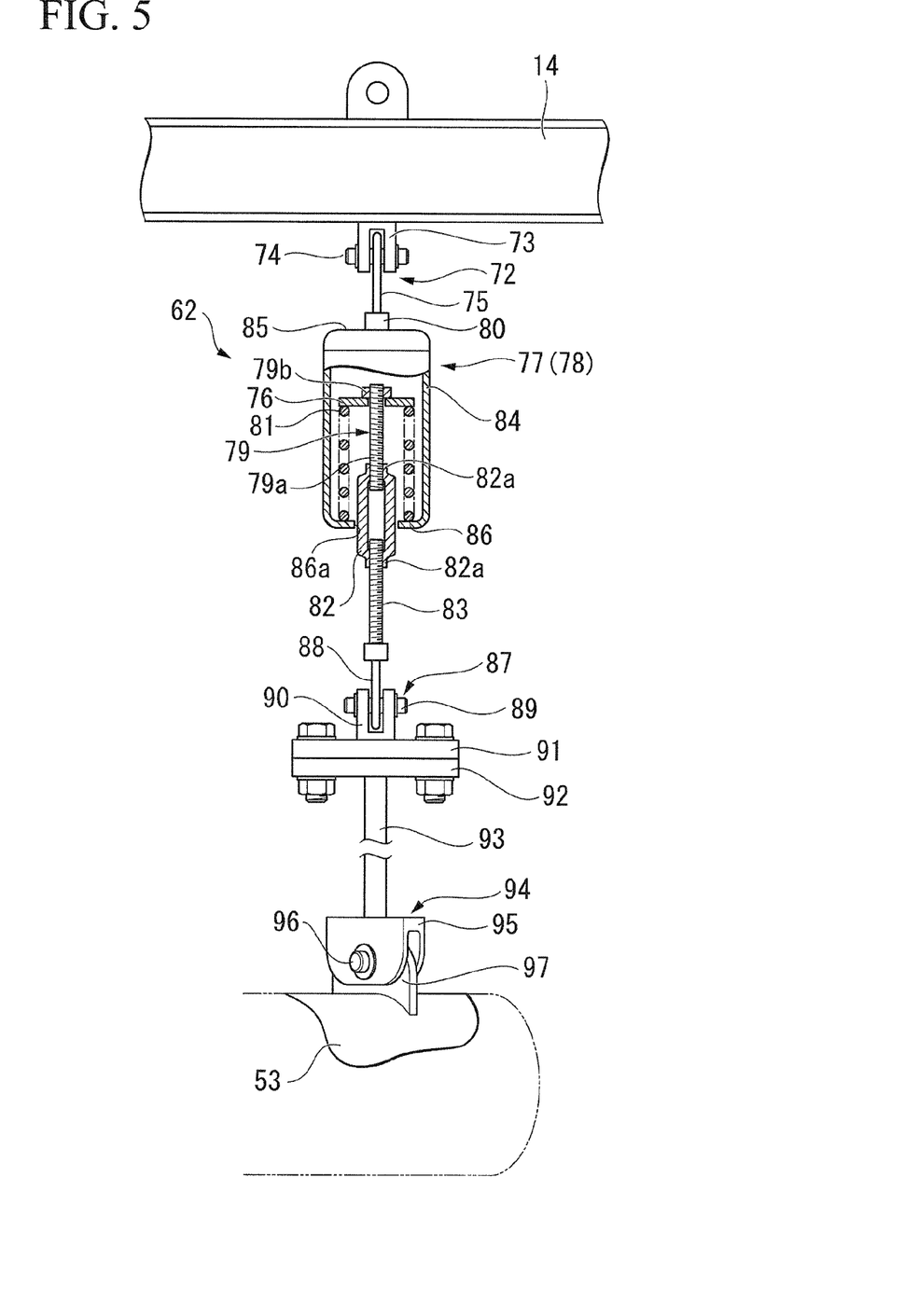
FIG. 5 is a partially-broken cross sectional view which shows a second hanging member of the embodiment.

FIG. 5 is a partially broken cross section view of the second hanging member.

Further, as shown in FIG. 2 to FIG. 5, the second hanging members 62 are installed at such positions corresponding to the both sides of the above-described high-temperature side header 53 in the circumferential direction. Each of the second hanging members 62 is coupled at the upper end thereof to the upper angle 14, while being loosely inserted at the lower end thereof into a through hole 44b (refer to FIG. 2) formed on the casing 41 and coupled to the high-temperature side header 53. Since the pair of second hanging members 62 are similar in constitution, in the following description, a description will be given of only one of the second hanging members 62.

The second hanging member 62 is provided with a second pin connecting portion 72 which is allowed to sway with respect to the upper angle 14. The second pin connecting portion 72 is provided with a female clevis 73 which protrudes from the upper angle 14 downward, and a male clevis 75 which is supported via a coupling pin 74 so as to sway with respect to the female clevis 73. The female clevis 73 and the male clevis 75 are similar in constitution to the first pin connecting portion 64 of the above-described first hanging member 61. A pin hole (not shown) is formed on each of the female clevis 73 and the male clevis 75 at a position where they are overlapped in the thickness direction. The coupling pin 74 is inserted through each of the pin holes, by which the male clevis 75 is allowed to sway around the coupling pin 74 with respect to the female clevis 73.

A spring hanger 77 is attached to the lower end of the male clevis 75. As shown in FIG. 5, the spring hanger 77 is provided with a piston rod 79 which is placed inside a hanger case 78, a coil spring 81 which is placed between the piston rod 79 and the hanger case 78, an end plate 76 which is installed between the piston rod 79 and the coil spring 81, a turn buckle 82 which is screwed into the lower end portion of the piston rod 79, and a fastening rod 83 which is screwed into the lower end of the turn buckle 82.

The hanger case 78 is a closed-end tubular member and provided with a tubular portion 84 which extends so that the axial direction is in alignment with the vertical direction, and an upper cover 85 and a lower cover 86 which are placed so as to cover opening portions on both ends of the tubular portion 84.

The upper cover 85 is formed in a circular plate shape and provided at the center part of the upper face thereof with a protrusion piece 80 which protrudes upward. The lower end portion of the male clevis 75 at the above-described second pin connecting portion 72 is coupled to the protrusion piece 80.

The lower cover 86 is formed in a circular plate shape and provided at the center part thereof with a through hole 86a which penetrates in the vertical direction. Then, the hanger case 78 is communicatively connected between the interior and the exterior through the through hole 86a.

The piston rod 79 is provided with a rod main body 79a extending along the vertical direction, and a nut 79b fastened to the upper end portion of the rod main body 79a.

The coil spring 81 is installed between the nut 79b and the lower cover 86 so as to enclose the rod main body 79a, biasing the nut 79b and the lower cover 86 in a direction which keeps them apart from each other.

The end plate 76 is a ring-shaped member which is formed coaxially with the rod main body 79a and formed so as to be larger in diameter than the through hole 86a of the lower cover 86. Then, the rod main body 79a is loosely inserted into a through hole formed at the center part of the end plate 76. The end plate 76 is held between the coil spring 81 and the nut 79b of the piston rod 79. In addition, the end plate 76 and the nut 79b are allowed to turn axially around the hanger case 78.

The turn buckle 82 is placed in such a manner that an upper half portion thereof is loosely inserted into the through hole 86a of the lower cover 86 and accommodated inside the hanger case 78. A female screw portion 82a which is hexagonal in a planar view is formed at each of the upper and lower end portions of the turn buckle 82. Then, the lower end portion of the above-described rod main body 79a is screwed into the female screw portion 82a on the upper end side of the turn buckle 82, while the fastening rod 83 is screwed into the female screw portion 82a on the lower end side thereof. In this instance, the turn buckle 82 is turned, by which the fastening rod 83 moves forward or backward with respect to the turn buckle 82, thus making it possible to adjust the length of the spring hanger 77 in the vertical direction.

A third pin connecting portion 87 is installed below the fastening rod 83. The third pin connecting portion 87 is provided with a male clevis 88 installed at the lower end portion of the fastening rod 83, and a female clevis 90 which is supported via a coupling pin 89 so as to sway with respect to the male clevis 88. The female clevis 90 and the male clevis 88 are similar in constitution to the above-described pin connecting portions 64, 72. A pin hole (not shown) is formed on each of the female clevis 90 and the male clevis 88 at a position where they are overlapped in the thickness direction. The coupling pin 89 is inserted through the pin holes, by which the female clevis 90 is allowed to sway around the coupling pin 89 with respect to male clevis 88.

A supporting rod 93 is coupled to the lower end portion of the third pin connecting portion 87 via flange portions 91, 92. The supporting rod 93 is a rod-like member in which the axial direction extends along the vertical direction, with the lower end side thereof loosely inserted into the through hole 44b formed on the casing 41. Then, the lower end of the supporting rod 93 is coupled to the high-temperature side header 53 via a fourth pin connecting portion 94 inside the casing 41.

The fourth pin connecting portion 94 is provided with a female clevis 95 installed at the lower end portion of the supporting rod 93, and a male clevis 97 supported via a coupling pin 96 so as to sway with respect to the female clevis 95. The female clevis 95 and the male clevis 97 are similar in constitution to the above-described pin connecting portions 64, 72, 87, and a pin hole (not shown) is formed at each of the female clevis 95 and the male clevis 97 at a position where they are overlapped in the thickness direction. The coupling pin 96 is inserted through the pin holes, by which the female clevis 95 is allowed to sway around the coupling pin 96 with respect to the male clevis 97. In the present embodiment, the axial direction of the coupling pin 96 at the fourth pin connecting portion 94 extends along a direction intersecting with the axial direction of each of the coupling pins 74, 89 respectively at the above-described second pin connecting portion 72 and the third pin connecting portion 87 (for example, about 90 degrees). In addition, the coupling pin 96 is constituted so as to sway in a direction intersecting with the second pin connecting portion 72 or the third pin connecting portion 87. Further, a seal member (not shown) is installed between the supporting rod 93 and the through hole 44b. The seal member seals the through hole 44b of the casing 41, insulating heat between the interior and the exterior of the casing 41, thus making it possible to seal the supporting rod 93 so as to be movable inside the through hole 44b.

As described above, the heat receiving portion 42 of the present embodiment is supported in a hanging manner from outside of the casing 41 by the first hanging member 61 coupled to the circumferential center part of the high-temperature side header 53 and the pair of second hanging members 62 coupled to the both ends of the high-temperature side header 53 in the circumferential direction. More specifically, the first hanging member 61 is supported at the upper end thereof by the upper angle 14 so as to sway freely, while the lower end thereof is fixed to the high-temperature side header 53. Further, the second hanging member 62 is supported at the upper end thereof by the upper angle 14 so as to sway freely, while being supported at the lower end thereof by the high-temperature side header 53 so as to sway freely.

As shown in FIG. 2 and FIG. 3, a guide bar 98 extending downward is installed at the circumferential center part of the low-temperature side header 52. The guide bar 98 is loosely inserted into the through hole 45b formed at the bottom wall portion 45 of the casing 41 and drawn out to the outside of the casing 41.

Then, the guide bar 98 is supported at the lower end portion thereof by a slide bearing 99 outside of the casing 41 so as to slide freely along the vertical direction. The slide bearing 99 is attached to the leading end of a lower angle 16 extending from a lower part of the frame 13 to the front. That is, the guide bar 98 and the slide bearing 99 constitute a guide member which supports the heat receiving portion 42 so as to slide freely along the vertical direction.

(Method for Operating the Power Generation System)

Next, a description will be given of a method for operating the above-described power generation system.

First, as shown in FIG. 1, when the generator of the gas turbine unit 102 is actuated and the rotor is started to rotate, a working fluid flows into the compressor. The working fluid which has flown into the compressor is compressed inside the compressor, thereafter, flows into a heat receiver supplying channel 32. In addition, the working fluid is supplied from the heat receiver supplying channel 32 into the low-temperature side header 52 of the heat receiving portion 42.

As shown in FIG. 2, the working fluid which has been supplied into the low-temperature side header 52 is distributed in the circumferential direction over the entire inside of the low-temperature side header 52 and, thereafter, flows into each of heat receiving pipes 51 connected in the circumferential direction all over to the low-temperature side header 52. Then, the working fluid, which has flown into each of the heat receiving pipes 51, flows from the lower end side to the upper end side of the heat receiving pipe 51.

On the other hand, sunrays H1, H2 which have been made incident into heliostats 2 are reflected by the heliostats 2 and, thereafter, made incident into the casing 41 through the opening portion 15. The sunrays H1, H2 which have been made incident into the casing 41 and are received by the heat receiving pipes 51, are converted to thermal energy, thereby directly heating the heat receiving pipes 51. More specifically, as shown in FIG. 1, the sunray H1 from a heliostat 2 which is positioned at a point closest to the concentrating heat receiver 10 irradiates an upper part (the downstream side) of the heat receiving pipe 51. Further, the sunray H2 from a heliostat 2 positioned at a point most distant from the concentrating heat receiver 10 irradiates a lower part (the upstream side) of the heat receiving pipe 51.

Then, heat is exchanged between the thus heated heat receiving pipe 51 and a working fluid flowing inside the heat receiving pipe 51, by which the working fluid is increased in temperature during flowing inside the heat receiving pipe 51.

Then, the working fluid which has arrived at the downstream end of the heat receiving pipe 51 is increased in temperature and flows into the high-temperature side header 53. That is, the working fluid which has been heated at each of the heat receiving pipes 51 collects inside the high-temperature side header 53 and, thereafter, flows into a turbine supply channel through the heat receiver discharging channel 55.

The working fluid flowing inside the turbine supply channel flows into the turbine to actuate the turbine. Thereby, thermal energy of the working fluid supplied from the turbine supply channel is converted to rotational energy of the rotor, thereby generating a driving force to the turbine. Then, the driving force is output to the generator coupled to the rotor, thereby generating power. The working fluid which flows inside the turbine is turned into a discharge gas, which is then discharged from the turbine.

Here, in the present embodiment, there are provided the hanging members 61, 62 in which the upper end portions thereof are coupled to the upper angle 14 while the lower end portions thereof are loosely inserted into the through holes 44a, 44b of the casing 41, thereby supporting in a hanging manner the heat receiving portion 42.

According to the above-described constitution, the heat receiving portion 42 is not restricted by the casing 41 and supported outside of the casing 41 only by each of the hanging members 61, 62. Therefore, when the heat receiving portion 42 is thermally elongated, the heat receiving portion 42 undergoes a relative deformation with respect to the casing 41. Thereby, it is possible to allow deformation of the heat receiving portion 42 by the thermal elongation and also to suppress the occurrence of thermal stress.

Further, the heat receiving portion 42 of the present embodiment is supported in a hanging manner by the hanging members 61, 62 which are coupled to the high-temperature side header 53 placed at the upper end portion thereof, with the lower end portion (the low-temperature side header 52) being a free end. It is, therefore, possible to allow deformation of the heat receiving portion 42 by thermal elongation in the vertical direction, in particular. It is also possible to support the heat receiving portion 42 stably.

Still further, since the first hanging member 61 is fixed to the circumferential center part of the high-temperature side header 53, it is possible to disperse thermal elongation of the heat receiving portion 42 to both sides of the high-temperature side header 53 from a point at which the first hanging member 61 (the heat receiver discharging channel 55) is coupled to the high-temperature side header 53. Thereby, as compared with a case where an entire part of the heat receiving portion 42 is supported so as to sway, it is possible to suppress an entire inclination and subsequent deformation of the heat receiving portion 42 and also decrease the deformation amount of the heat receiving portion 42.

In this instance, since each of the second hanging members 62 is allowed to sway by the pin connecting portions 72, 87, 94, the hanging member 62 will sway, following the thermal elongation of the heat receiving portion 42 occurring from the first hanging member 61. Thereby, it is possible to allow more smoothly deformation of the heat receiving portion 42 by thermal elongation in the horizontal direction, in particular.

Further, since the pin connecting portions 87, 94 of the above-described second hanging member 62 are allowed to sway in a mutually intersecting direction, the heat receiving portion 42 is allowed to sway along substantially in all directions inside a horizontal plane. Thereby, it is possible to allow more flexibly thermal elongation of the heat receiving portion 42.

In addition, since the second hanging member 62 is provided with the spring hanger 77, it is possible to allow thermal elongation of the heat receiving portion 42 in the vertical direction, in particular.

Further, it is also possible to absorb a difference in thermal elongation between the first hanging member 61 and the second hanging member 62.

Here, in the present embodiment, the guide members (the guide bar 98 and the slide bearing 99) are installed on the opposite side of the first hanging member 61 in the vertical direction, with the heat receiving portion 42 held between them. Thus, it is possible to allow thermal elongation of the heat receiving portion 42 in the vertical direction, with the thermal elongation thereof regulated in the horizontal direction. Thereby, together with the first hanging member 61, the guide members are able to suppress the entire inclination and subsequent deformation of the heat receiving portion 42.

Then, since the above-constituted concentrating heat receiving system 101 is provided with the above-described concentrating heat receiver 10, thermal stress acting on the heat receiving portion 42 can be suppressed to improve durability.

The technical scope of the present invention shall not be limited to the above-described embodiment but includes various modifications of the above-described embodiment within a scope not departing from the gist of the present invention. That is, specific structures and shapes described in the embodiment cover only an example and may be changed whenever necessary.

For example, in the above-described embodiment, a description has been given of a case where air heated by the concentrating heat receiver 10 is supplied as a working fluid to the turbine, to which the present invention shall not be, however, limited. The present invention may be constituted in such a manner that a different working fluid (for example, a combustion gas) is supplied to the turbine and the air heated by the heat receiving portion 42 is used to conduct heat exchange with the working fluid.

Further, when the concentrating heat receiver and the gas turbine unit are designed, a positional relationship between them may be changed, whenever necessary.

Still further, each of the hanging members 61, 62 shall not be limited to the constitution and the number which are described in the above-described embodiment.

Figure 6:
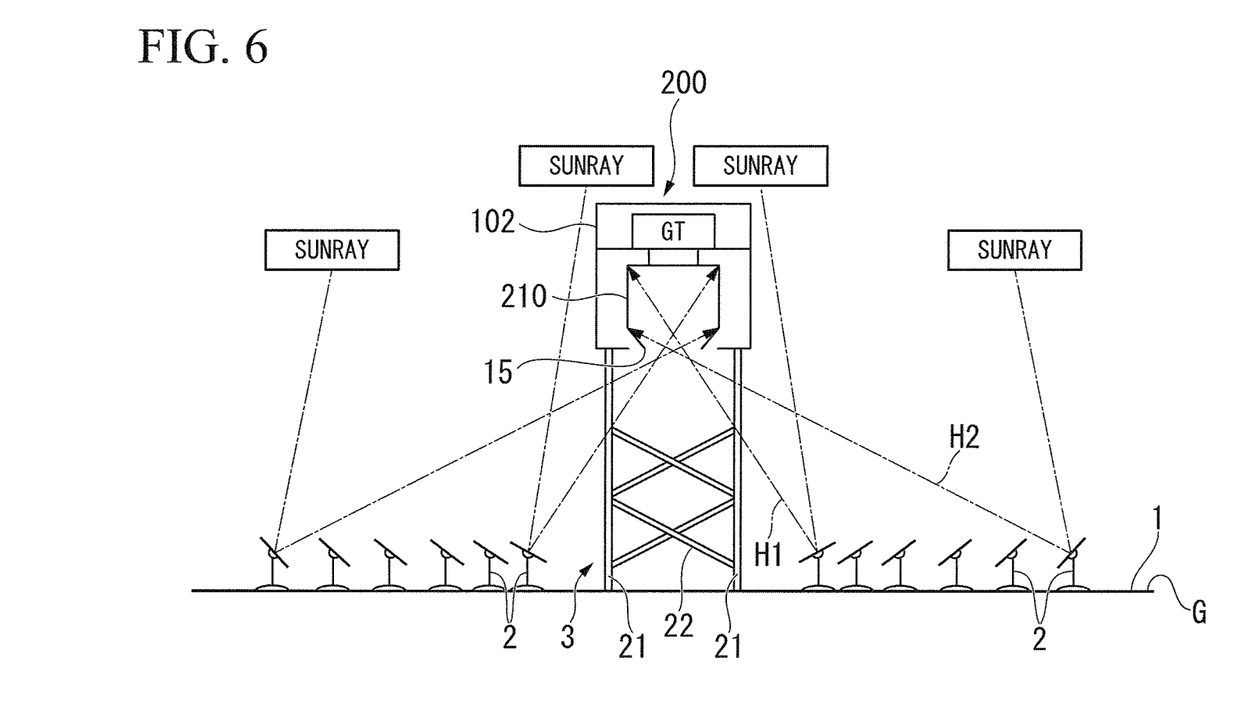
FIG. 6 is a side view which shows a power generation system of the present invention which has a different constitution from the embodiment.
Figure 7:
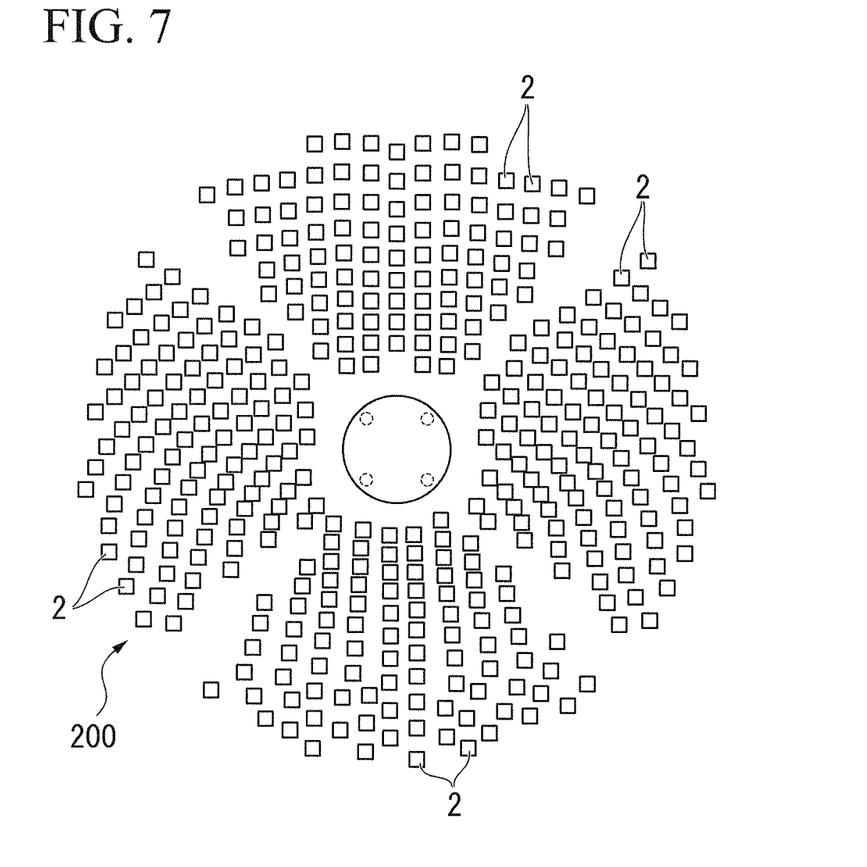
FIG. 7 is a plan view which shows the power generation system of the present invention which has a different constitution from the embodiment.

In the above-described embodiment, a description has been given of the power generation system 100 (a so-called one-side placement system) which is favorably placed at a high latitude area in the subtropical high-pressure belt. However, the present invention shall not be limited thereto but may be applicable to a so-called entire placement system in which the heliostats 2 are arrayed so as to surround an entire circumference of the power generation system 100. FIG. 6 is a side view which shows a power generation system of the present invention different in constitution. FIG. 7 is a plan view thereof.

More specifically, as shown in FIG. 6 and FIG. 7, there is installed at the center part of the heliostat field 1 a tower-like power generation system 200 for receiving sunrays (H1, H2 indicated by the arrow in FIG. 6) guided by the heliostats 2. That is, the heliostats 2 are placed 360 degrees around the power generation system 200 in order to surround the entire circumference thereof.

Figure 8:
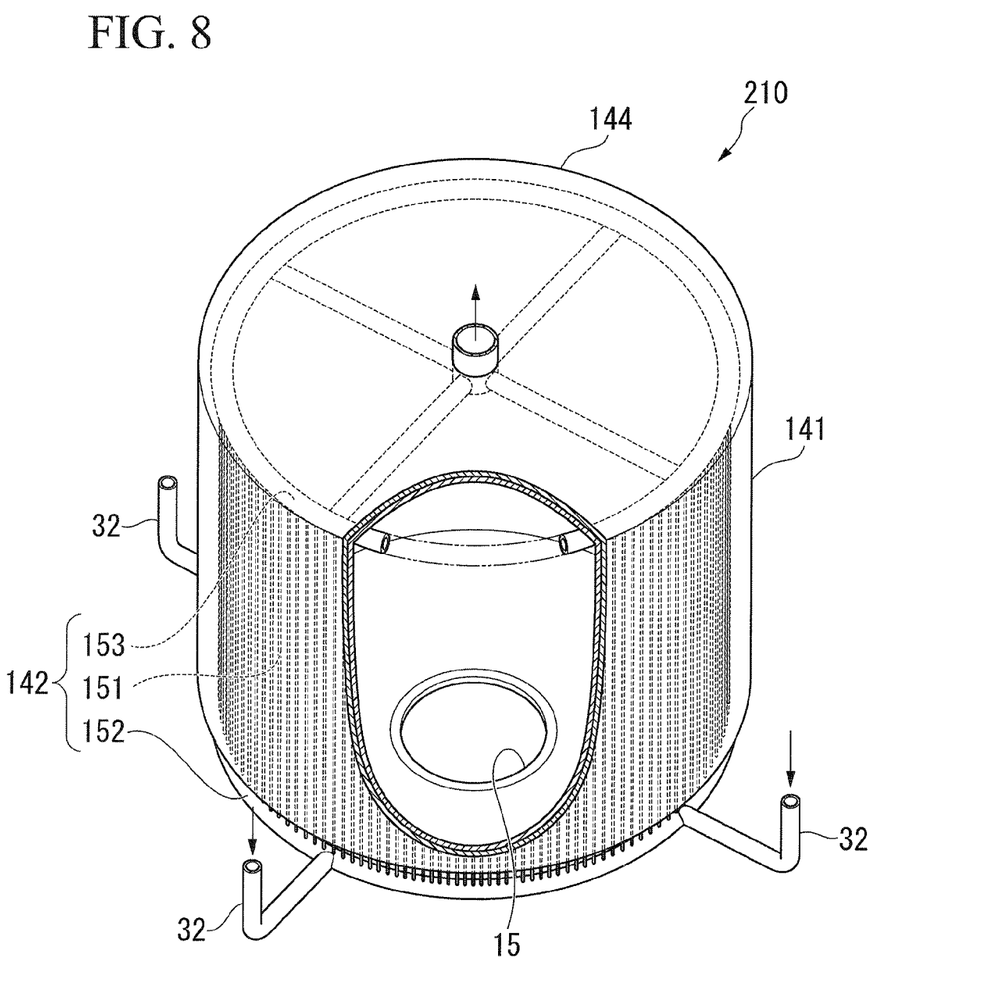
FIG. 8 is a partially broken perspective view which shows a concentrating heat receiver of the present invention which has a different constitution from the embodiment.
Figure 9:
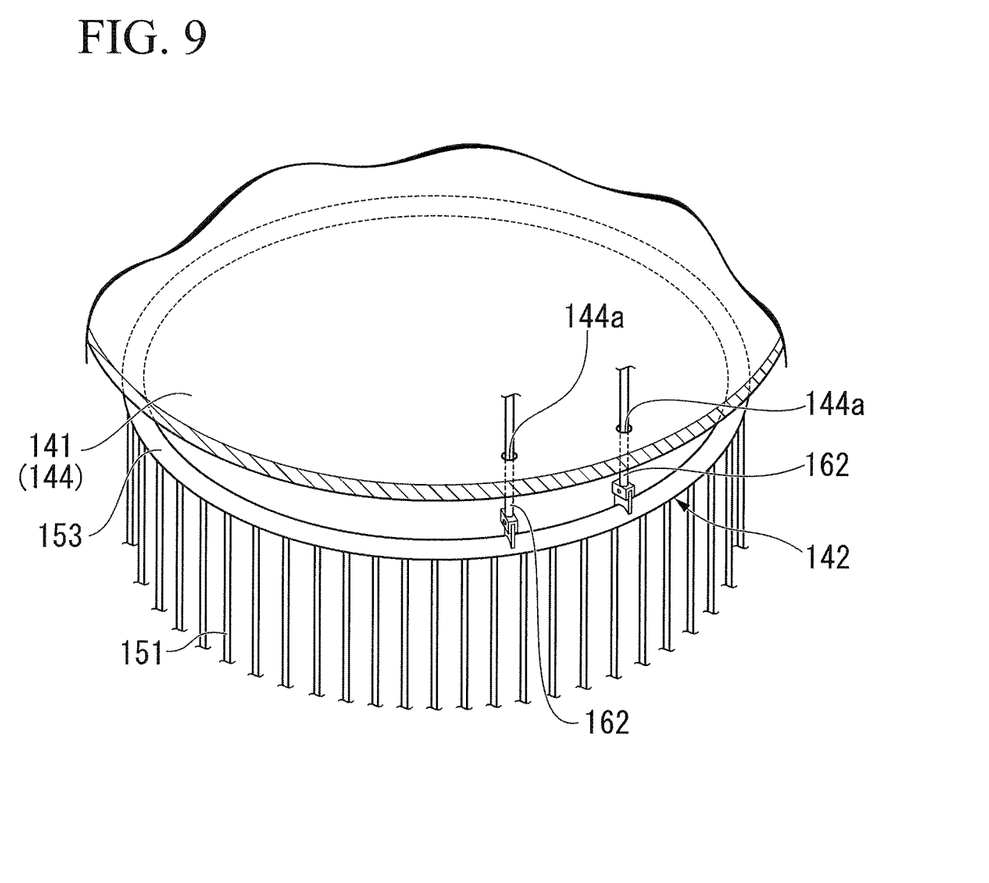
FIG. 9 is an enlarged perspective view which shows the concentrating heat receiver of the present invention which has a different constitution from the embodiment.

FIG. 8 is a partially broken perspective view which shows a concentrating heat receiver. FIG. 9 is an enlarged perspective view of the concentrating heat receiver. In the following description, the same constituents as those of the above-described embodiment will be given the same reference numerals, and a description thereof will be omitted here.

As shown in FIG. 8 and FIG. 9, the concentrating heat receiver 210 is provided with a closed-end tubular casing 141 which is placed in a state that the axial direction is in alignment with the vertical direction, and a heat receiving portion 142 which is accommodated inside a casing 141.

The casing 141 is closed at an upper part thereof by a top panel portion 144 while formed at a lower part thereof with an opening portion 15 which is opened to a ground G.

The heat receiving portion 142 is provided with a plurality of heat receiving pipes 151 arrayed in the circumferential direction over an entire inner wall face of a circumferential wall of the casing 141, a low-temperature side header 152 are collectively connected to one ends of the plurality of heat receiving pipes 151, where one ends are upstream side of the heat receiving pipes in relation to a flowing direction of a working fluid, and a high-temperature side header 153 are collectively connected to the other ends of the plurality of heat receiving pipes 151, where the other ends are downstream side of the heat receiving pipes in relation to the flowing direction of the working fluid.

The high-temperature side header 153 is an annular member which is placed along an outer circumference of a top panel portion 144 inside the casing 141, and a hanging member 162 is installed between the high-temperature side header 153 and an upper angle 14 (refer to FIG. 3). The hanging member 162 is similar in constitution to the second hanging member 62 of the above-described embodiment, for example. The hanging member 162 is coupled at the upper end thereof to the upper angle 14, while loosely inserted at the lower end side thereof into a through hole 144a of the casing 141 and coupled to the high-temperature side header 153 inside the casing 141. Thereby, in the entire placement system as well, it is possible to allow deformation of the heat receiving portion 142 by thermal elongation and also suppress the occurrence of thermal stress.

It is preferable that the above-described one-side placement system and the entire placement system are used separately depending on the solar altitude in a low latitude area and in a high latitude area.

INDUSTRIAL APPLICABILITY

In the solar concentrating heat receiver of the present invention, it is possible to allow thermal elongation of the heat receiving portion and thereby suppress thermal stress acting on heat receiving pipes.

Further, the solar concentrating heat receiving system of the present invention is provided with the solar concentrating heat receiver of the present invention. It is, therefore, possible to suppress thermal stress acting on the heat receiving portion and improve durability.

DESCRIPTION OF REFERENCE NUMERALS

2: Heliostat
3: Tower unit
10: Concentrating heat receiver (solar concentrating heat receiver)
13: Frame (base portion)
14: Upper angle (base portion)
15: Opening portion
41: Casing
42: Heat receiving portion
51: Heat receiving pipe
52: Low-temperature side header (working fluid introduction header)
53: High-temperature side header (working fluid discharge header)
55: Heat receiver discharging channel (first hanging member)
61: First hanging member
62: Second hanging member
98: Guide bar (guide member)
99: Slide bearing (guide member)
101: Concentrating heat receiving system (solar concentrating heat receiving system)

What is claimed is:

1. A solar concentrating heat receiver comprising:
a casing which is installed at a base portion to have an opening portion into which sunlight is made incident;
a heat receiving portion which is accommodated inside the casing so that a working fluid flows therethrough and receives heat from sunlight made incident from the opening portion, thereby raising a temperature of the working fluid; and
a hanging member in which one end of the heat receiving portion is coupled to the base portion and the other end thereof is loosely inserted into the casing, thereby supporting in a hanging manner the heat receiving portion inside the casing to allow deformation of the heat receiving portion by thermal elongation in a vertical direction.

2. The solar concentrating heat receiver according to claim 1, wherein
the heat receiving portion comprises:
a plurality of heat receiving pipes which extend along an inner circumferential face of the casing;
a working fluid introduction header which is coupled with one ends of the plurality of heat receiving pipes, wherein one ends are upstream side of the heat receiving pipes in relation to a flowing direction of a working fluid to introduce the working fluid to the plurality of heat receiving pipes; and
a working fluid discharge header which is coupled with the other ends of the plurality of heat receiving pipes, wherein the other ends are downstream side of the heat receiving pipes in relation to the flowing direction of the working fluid to discharge the working fluid which has flowed through the plurality of heat receiving pipes; and
the working fluid discharge header is placed upward on the plurality of heat receiving pipes in a vertical direction, and
the hanging member is coupled at the other end thereof to the working fluid discharge header.

3. The solar concentrating heat receiver according to claim 2, wherein
the hanging member comprises:
a first hanging member which is fixed to the working fluid discharge header at a center part of the working fluid discharge header in an extending direction; and
a pair of second hanging members which are coupled to the working fluid discharge header on both sides of the first hanging member in the extending direction and allowed to sway so as to follow displacement of the heat receiving portion.

4. The solar concentrating heat receiver according to claim 2, wherein
the working fluid introduction header is provided with a guide member which allows the heat receiving portion to slide along the vertical direction with respect to the casing.

5. The solar concentrating heat receiver according to claim 3, wherein the working fluid introduction header is provided with a guide member which allows the heat receiving portion to slide along the vertical direction with respect to the casing.

6. A solar concentrating heat receiving system comprising:
a plurality of reflecting minors which are placed on a ground to reflect sunrays; a tower unit which is erected from the ground, and
a solar concentrating heat receiver which is supported by the tower unit, the solar concentrating heat receiver including:
  a casing which is installed at a base portion to have an opening portion into which sunlight is made incident;
  a heat receiving portion which is accommodated inside the casing so that a working fluid flows therethrough and receives heat from sunlight made incident from the opening portion, thereby raising a temperature of the working fluid; and
  a hanging member in which one end of the heat receiving portion is coupled to the base portion and the other end thereof is loosely inserted into the casing, thereby supporting in a hanging manner the heat receiving portion inside the casing to allow deformation of the heat receiving portion by thermal elongation in a vertical direction.

7. The solar concentrating heat receiving system according to claim 6, wherein the heat receiving portion comprises:
  a plurality of heat receiving pipes which extend along an inner circumferential face of the casing;
  a working fluid introduction header which is coupled with one ends of the plurality of heat receiving pipes, wherein one ends are upstream side of the heat receiving pipes in relation to a flowing direction of a working fluid to introduce the working fluid to the plurality of heat receiving pipes; and
  a working fluid discharge header which is coupled with the other ends of the plurality of heat receiving pipes, wherein the other ends are downstream side of the heat receiving pipes in relation to the flowing direction of the working fluid to discharge the working fluid which has flowed through the plurality of heat receiving pipes; and
  the working fluid discharge header is placed upward on the plurality of heat receiving pipes in a vertical direction, and
  the hanging member is coupled at the other end thereof to the working fluid discharge header.

8. The solar concentrating heat receiving system according to claim 7, wherein
the hanging member comprises:
  a first hanging member which is fixed to the working fluid discharge header at a center part of the working fluid discharge header in an extending direction; and
  a pair of second hanging members which are coupled to the working fluid discharge header on both sides of the first hanging member in the extending direction and allowed to sway so as to follow displacement of the heat receiving portion.

9. The solar concentrating heat receiving system according to claim 7, wherein
the working fluid introduction header is provided with a guide member which allows the heat receiving portion to slide along the vertical direction with respect to the casing.

10. The solar concentrating heat receiving system according to claim 8, wherein
the working fluid introduction header is provided with a guide member which allows the heat receiving portion to slide along the vertical direction with respect to the casing.

* * * * *